(12) United States Patent
Kumar et al.

(10) Patent No.: US 8,572,598 B1
(45) Date of Patent: Oct. 29, 2013

(54) METHOD AND SYSTEM FOR UPGRADING SOFTWARE IN A COMPUTING DEVICE

(75) Inventors: Ratin Kumar, Santa Clara, CA (US); Charles T. Inman, Foster City, CA (US)

(73) Assignee: Nvidia Corporation, Santa Clara, CA (US)

( * ) Notice: Subject to any disclaimer, the term of this patent is extended or adjusted under 35 U.S.C. 154(b) by 1894 days.

(21) Appl. No.: 11/736,806

(22) Filed: Apr. 18, 2007

(51) Int. Cl.
*G06F 9/44* (2006.01)

(52) U.S. Cl.
USPC ............................ 717/168; 717/175; 717/177

(58) Field of Classification Search
USPC ................................ 717/168–178; 714/37–39
See application file for complete search history.

(56) References Cited

U.S. PATENT DOCUMENTS

| | | | |
|---|---|---|---|
| 5,579,522 A * | 11/1996 | Christeson et al. ............... | 713/2 |
| 5,701,492 A * | 12/1997 | Wadsworth et al. ............ | 717/173 |
| 5,943,242 A | 8/1999 | Vorbach et al. | |
| 6,021,490 A | 2/2000 | Vorbach et al. | |
| 6,081,903 A | 6/2000 | Vorbach et al. | |
| 6,119,181 A | 9/2000 | Vorbach et al. | |
| 6,275,931 B1 * | 8/2001 | Narayanaswamy et al. ...... | 713/2 |
| 6,279,153 B1 * | 8/2001 | Bi et al. ........................ | 717/171 |
| 6,338,106 B1 | 1/2002 | Vorbach et al. | |
| 6,405,299 B1 | 6/2002 | Vorbach et al. | |
| 6,425,068 B1 | 7/2002 | Vorbach et al. | |
| 6,480,937 B1 | 11/2002 | Vorbach et al. | |
| 6,542,998 B1 | 4/2003 | Vorbach et al. | |
| 6,571,381 B1 | 5/2003 | Vorbach et al. | |
| 6,697,979 B1 | 2/2004 | Vorbach et al. | |
| 7,003,660 B2 | 2/2006 | Vorbach et al. | |
| 7,095,858 B2 * | 8/2006 | Wagner et al. ................ | 380/281 |
| 7,210,129 B2 | 4/2007 | May et al. | |
| 7,266,725 B2 | 9/2007 | Vorbach et al. | |
| 7,394,284 B2 | 7/2008 | Vorbach | |
| 7,434,191 B2 | 10/2008 | Vorbach et al. | |
| 7,444,531 B2 | 10/2008 | Vorbach et al. | |
| 7,698,698 B2 * | 4/2010 | Skan .............................. | 717/168 |
| 2004/0062130 A1 * | 4/2004 | Chiang .................... | 365/230.03 |
| 2004/0083469 A1 * | 4/2004 | Chen et al. .................... | 717/168 |
| 2005/0204351 A1 * | 9/2005 | Jiang et al. .................... | 717/162 |
| 2006/0059300 A1 * | 3/2006 | Hsu et al. ...................... | 711/112 |

OTHER PUBLICATIONS

Scheu et al., Incremental update and upgrade of Spatial Data; Citeseer, 2000, pp. 1-11.*
Brown et al., Updating software in wireless sensor networks: A survey, Citeseer, 2006, pp. 1-14.*
Stuckenholz et al., Safe component updates, ACM, 2006, pp. 39-48.*

\* cited by examiner

*Primary Examiner* — Wei Zhen
*Assistant Examiner* — Satish Rampuria
(74) *Attorney, Agent, or Firm* — Patterson & Sheridan, L.L.P.

(57) ABSTRACT

A method and system for upgrading a software component in a computing device are disclosed. Specifically, one embodiment of the present invention sets forth a method, which includes the steps of storing a first software component in a first memory segment, maintaining a second software component in a second memory segment, wherein the second software component enables the computing device to boot up, and modifying at least one of a plurality of address lines to access the second memory segment after exiting a reset condition, if the execution of the first software component fails to satisfy a predetermined test condition.

20 Claims, 8 Drawing Sheets

| Address Bit 24 | Recovery Mode Flag | Modified Address Bit |
|---|---|---|
| 0 | 0 | 0 |
| 0 | 1 | 1 |
| 1 | 0 | 1 |
| 1 | 1 | 0 |

FIG. 6

METHOD AND SYSTEM FOR UPGRADING SOFTWARE IN A COMPUTING DEVICE

BACKGROUND OF THE INVENTION

1. Field of the Invention

Embodiments of the present invention relate generally to product upgrade techniques and more specifically to a method and system for upgrading software in a computing device.

2. Description of the Related Art

Unless otherwise indicated herein, the approaches described in this section are not prior art to the claims in this application and are not admitted to be prior art by inclusion in this section.

The consumer electronics marketplace is known to be fiercely competitive. Because of the tremendous and constant pressure to bring new products to the market at a faster pace and also at lower prices, these product offerings are often fraught with reliability issues due to sloppy quality assurance processes, deployment of transient technologies, and buggy designs. Moreover, since consumer electronic products tend to have a user life that lasts several years, these products typically need to go through multiple upgrades to address the reliability issues. With most of the consumer electronic products come equipped with flash memories, a typical upgrade process involves downloading a software image from a source system on a network and loading the software image into the flash memories of the target products without replacing the target products.

Figure 1A:
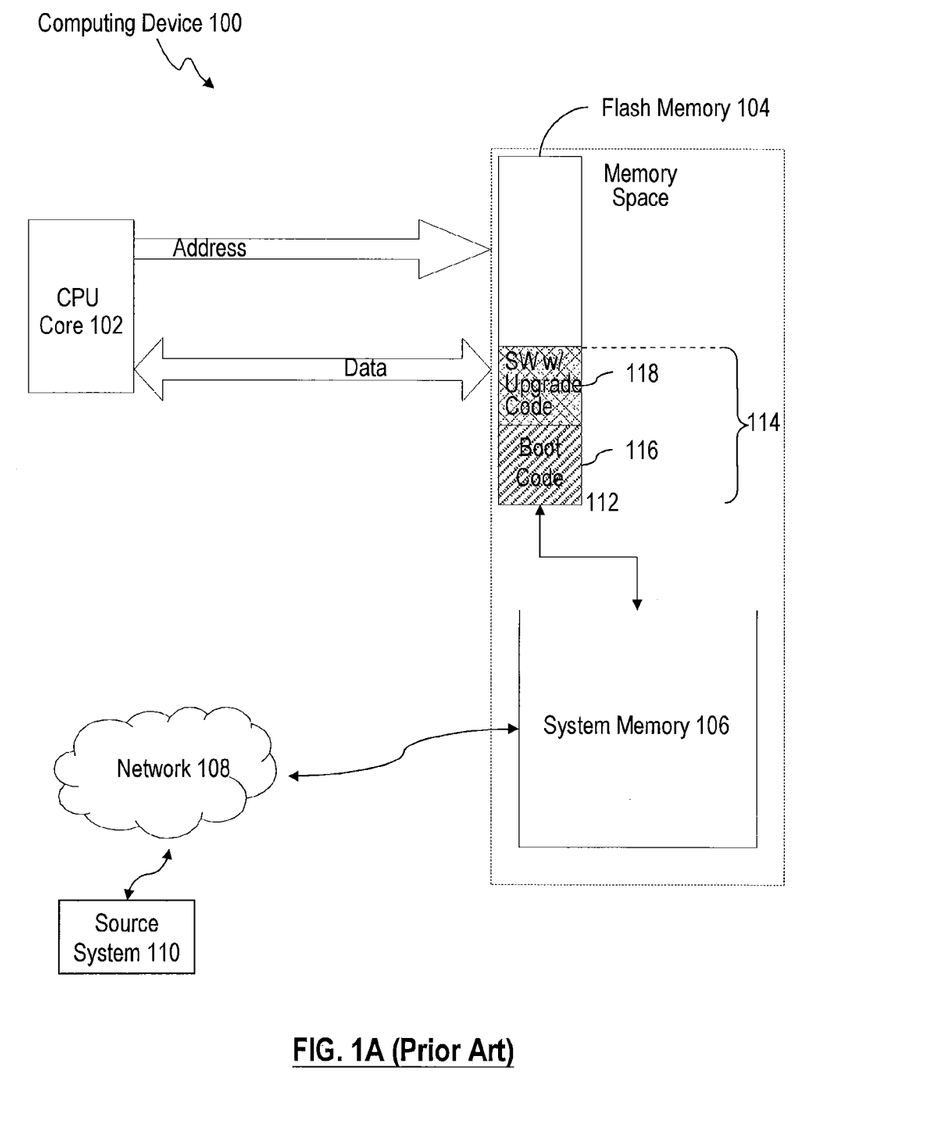
FIG. 1A is a conceptual diagram of some components in a computing device that are involved in a conventional upgrade process.
Figure 1B:
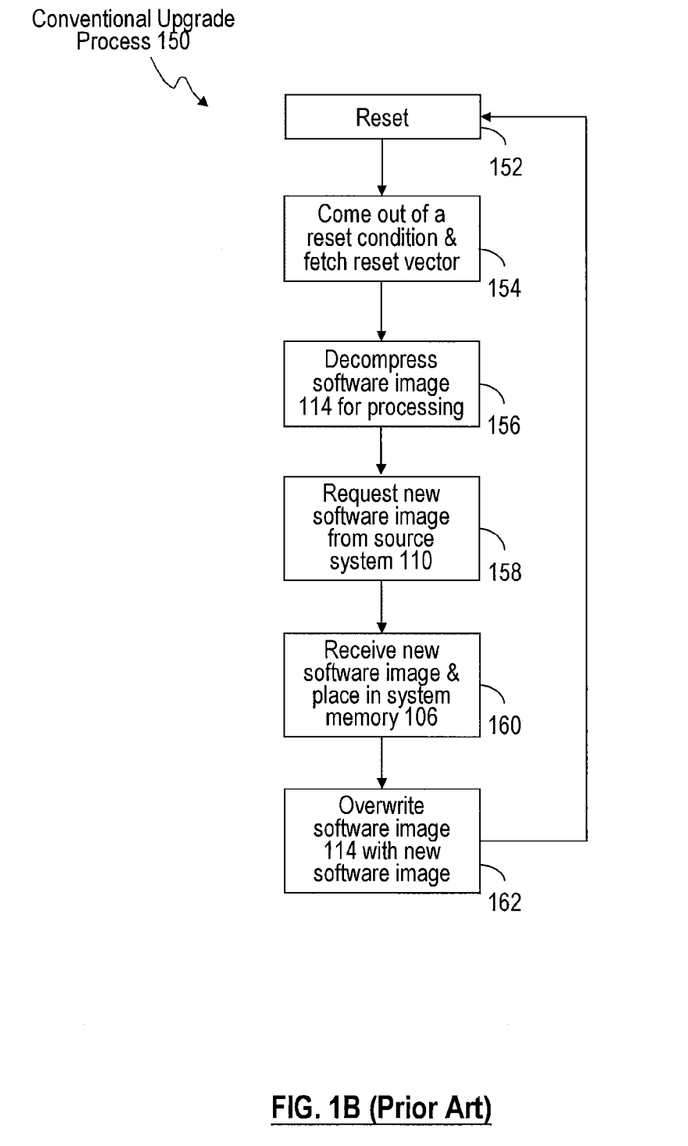
FIG. 1B is a flowchart illustrating the method steps in a conventional upgrade process.

To further demonstrate the upgrade process, FIG. 1A is a conceptual diagram of some components in a computing device 100 that are involved in a conventional upgrade process 150, and FIG. 1B is a flowchart illustrating the method steps in the conventional upgrade process 150. The components that are involved include a CPU core 102, a flash memory 104, and a system memory 106. The computing device 100 communicates with a source system 110 via a network 108. When the CPU core 102 comes out of a reset condition, it fetches the instruction from a predetermined address 112 in step 154. This predetermined address 112 is commonly referred to as a "reset vector." Executing the instruction then triggers the retrieval of a software image 114, often in a compressed form, from the flash memory 104. In step 156, the software image 114 is decompressed and placed in the system memory 106 for further processing. Suppose the software image 114 includes a boot code segment 116 and an application software segment 118, which includes some upgrade code. Under normal operating conditions, the CPU core 102 successfully executes the upgrade code, and the computing device 100 proceeds to request a new software image from the source system 110 via the network 108 in step 158. In step 160, the computing device 100 receives the new software image from the source system 110 and places the image in the system memory 106 for further processing. Lastly, the new software image is placed in the flash memory 104 to overwrite the software image 114 in step 162, and the computing device 100 reboots in step 152 so that the new software image can take effect.

The conventional upgrade process 150 has flaws that may render the computing device 100 non-operational. For example, if an unexpected system failure, such as a power failure, occurs while the new software image is being written into the flash memory 104, then the boot code segment 116 may be corrupted with useless and non-operational code. If the instruction at the reset vector is corrupted, then the computing device 100 cannot complete its reboot sequence and remains in an undefined state. At this point, sellers of the computing device 100 mostly likely need to replace the unit for the customer. Especially in a mass deployment situation, if this irrecoverable failure applies to many of the deployed computing devices, then it significantly reduces the appeal of this product to customers and also places tremendous burden on sellers to replace all the failed units.

As the foregoing illustrates, what is needed in the art is a software upgrade process that is robust and addresses at least the shortcomings of the prior art approaches set forth above.

SUMMARY OF THE INVENTION

A method and system for upgrading a software component in a computing device are disclosed. Specifically, one embodiment of the present invention sets forth a method, which includes the steps of storing a first software component in a first memory segment, maintaining a second software component in a second memory segment, wherein the second software component enables the computing device to boot up, and modifying at least one of a plurality of address lines to access the second memory segment after exiting a reset condition, if the execution of the first software component fails to satisfy a predetermined test condition.

One advantage of the disclosed method and system is that a software upgrade process for a computing device can be performed in a robust and recoverable manner.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this disclosure, one embodiment of the present invention is implemented as a program product for use with a computing device. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computing device) on which information is permanently stored; (ii) writable storage media (e.g., writeable memory devices such as flash memory) on which alterable information is stored. Such computer-readable storage media, when carrying computer-readable instructions that direct the functions of the present invention, are embodiments of the present invention. Other media include communications media through which information is conveyed to a computing device, such as through a data or telephone network, including wireless communications networks. The latter embodiment specifically includes transmitting information to/from the Internet and other networks. Such communications media, when carrying computer-readable instructions that direct the functions of the present invention, are embodiments of the present invention.

Figure 2A:
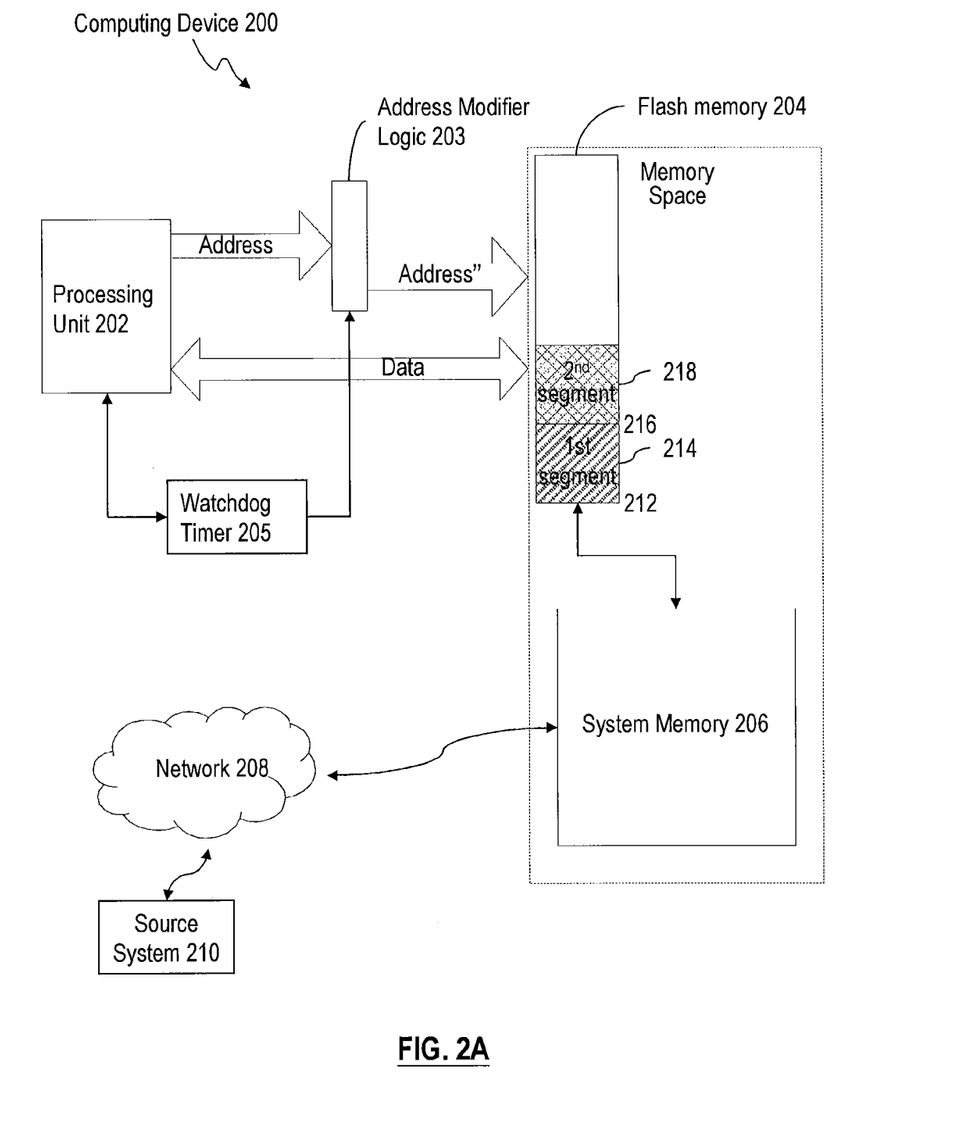
FIG. 2A is a conceptual diagram of some components in a computing device that are involved in a robust software upgrade process, according to one embodiment of the present invention.
Figure 2B:
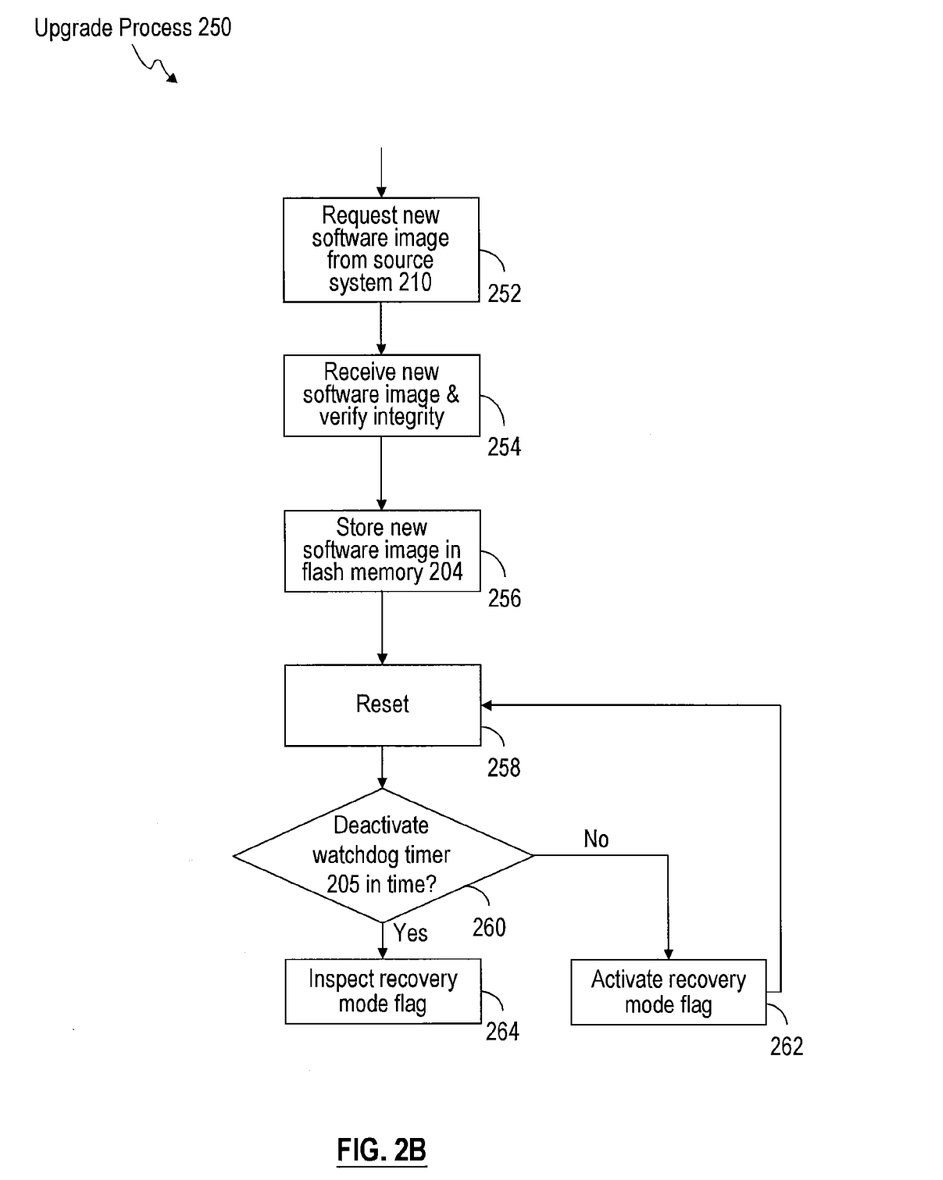
FIG. 2B is a flowchart illustrating the method steps in a robust software upgrade process, according to one embodiment of the present invention.
Figure 3:
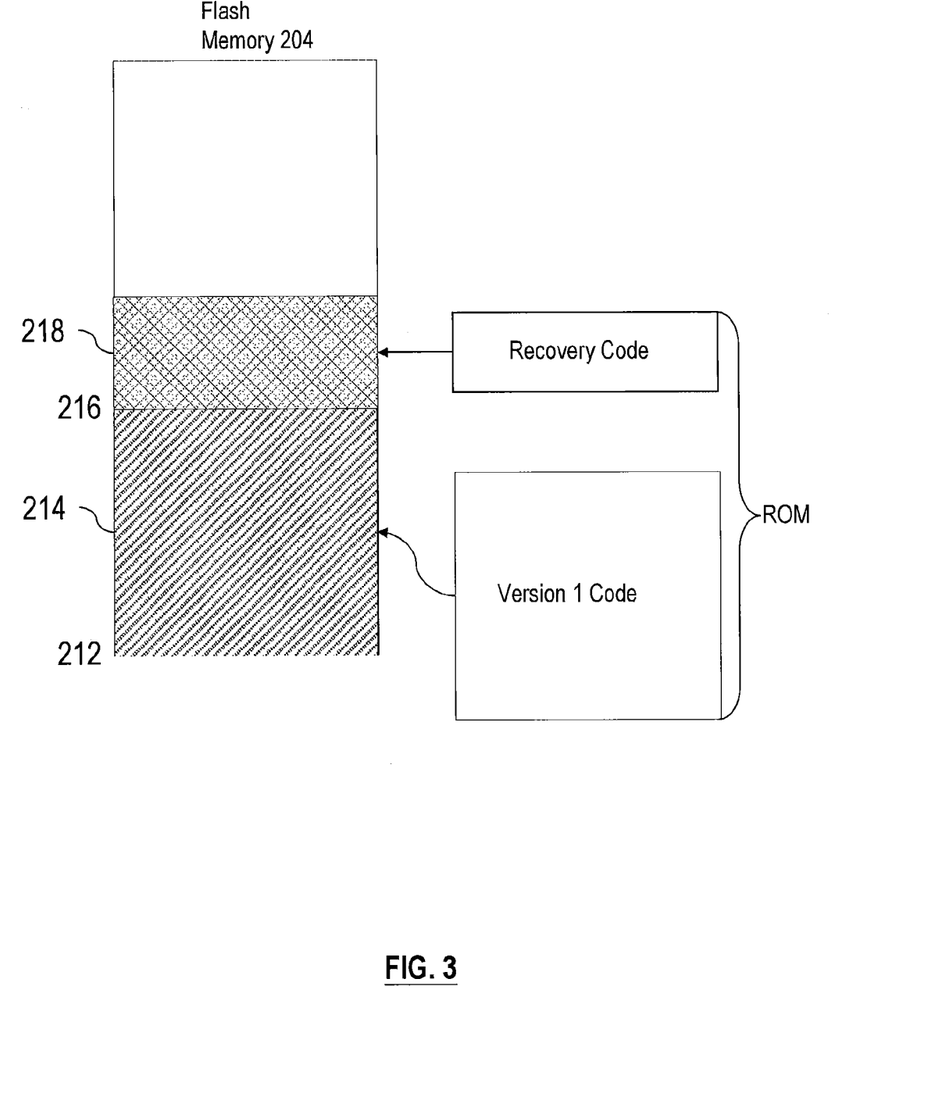
FIG. 3 is a simplified diagram of several memory components in a computing device utilized to enable recovery from a failed upgrade process, according to one embodiment of the present invention.

FIG. 2A is a conceptual diagram of some components in a computing device 200 that are involved in a robust software upgrade process 250, according to one embodiment of the present invention. FIG. 2B is a flowchart illustrating the method steps in this upgrade process 250. Without limitation, the computing device 200 may be a game console, set top box, networking device, cellular telephone, hand-held device, mobile device, computer based simulator, desktop computer, laptop computer, palm-sized computer, tablet computer, or the like. The components that are involved mainly include a processing unit 202, address modifier logic 203, a flash memory 204, a watchdog timer 205, and a system memory 206. The flash memory 204 has a first segment 214 and a second segment 218. Suppose the first segment 214 initially contains a version 1 of a particular software code X. Unlike the conventional upgrade process 150, the upgrade process 250 includes a failure tracking mechanism and a code relocation mechanism. Specifically, after receiving a new software image, a version 2 of the software code X, from the source system 210, the computing device 200 verifies the integrity of the version 2 code in step 254. If the integrity of the version 2 code is confirmed, then the processing unit 202 proceeds to store the version 2 code in the flash memory 204. In one implementation, before storing the version 2 code in the first segment 214, the version 1 code from the first segment 214 is copied to the second segment 218 as a backup. In another implementation, the version 1 code is not copied to the second segment 218; instead, a read-only memory ("ROM") module of the computing device 200 is pre-loaded with some recovery code before the shipping of the device as shown in FIG. 3. The ROM module is configured to occupy the address space of the second segment 218. In addition, another ROM module is also pre-loaded with a working version of the code, such as the version 1 code.

In step 258, the computing device 200 reboots, so that the version 2 code can take effect. When the processing unit 202 comes out the reset condition, it activates the watchdog timer 205, causing the watchdog timer 205 to load a pre-determined value and begin counting down. If executing the new instruction at the reset vector 212 leads to successfully bringing up the intended software components of the version 2 code, the software components deactivate the watchdog timer 205 before the count reaches zero in step 260. The upgrade process 250 is considered a success. On the other hand, if the watchdog timer 205 fails to receive the reset signal timely, signifying serious errors in executing the instructions of the version 2 code, then the watchdog timer 205 counts down to zero and activates a recovery mode flag for the address modifier logic 203 in step 262. In one implementation, the address modifier logic 203 ensures the execution of the instruction at a relocated reset vector 216 instead of at the default reset vector 216 after the processing unit 202 comes out of a reset condition and also sends a reset signal ("RST") to the processing unit 202. If the version 1 code is backed up in the second segment 218 in step 256, then the address modifier logic 203 also ensures the execution of the version 1 code. Alternatively, as shown in FIG. 3, if the recovery code resides within the memory locations of the second segment 218, then the address modifier logic 203 ensures the retrieval of the recovery code from the ROM module and the subsequent execution of it. The recovery code, when executed, causes the processing unit 202 to perform the basic functions that keep the computing device 200 operational. It may also include instructions, when executed, causes the processing unit 202 to retrieve the pre-loaded version 1 code from the ROM module for further processing. After the processing unit 202 comes out of the reset condition in step 258, executing the instruction at the relocated reset vector 216 should allow the computing device 200 to boot up successfully. Depending on the state of the recovery mode flag, various implementation options are possible in step 264. Subsequent paragraphs will provide some examples.

Figure 4:
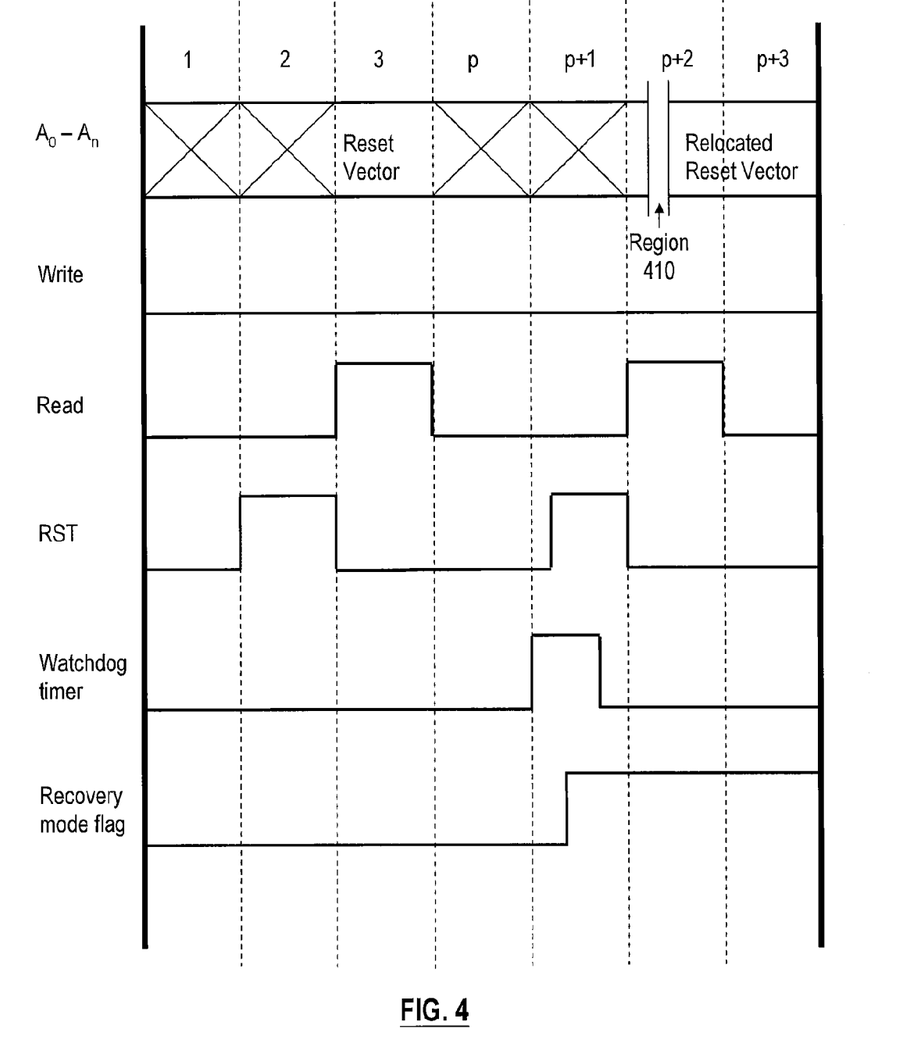
FIG. 4 is a timing diagram illustrating the relationships among some key signals utilized in a robust software upgrade process, according to one embodiment of the present invention.

In conjunction with FIG. 2A and FIG. 2B, FIG. 4 is a timing diagram illustrating the relationships among some key signals utilized in the upgrade process 250, according to one embodiment of the present invention. It should be noted that some portions of the address lines, $A_0$-$A_n$, are marked with "X" in FIG. 4, because they are not relevant to the present discussions. Suppose the steps 252-258 of FIG. 2B have been performed, and the RST is issued to the processing unit 202 of FIG. 2A in clock cycle 2. Suppose further that corrupted data is written to the first segment 214 in step 256. The processing unit 202 comes out of the reset condition in clock cycle 3, fetches the default reset vector 212 via the address lines, asserts its read signal to read the default reset vector 212, and activates the watchdog timer 205 to begin counting down. Suppose the watchdog timer 205 is configured to be deactivated by clock cycle p. Due to the corrupted data in the first segment 214, the deactivation of the watchdog timer 205 fails to occur. In clock cycle p+1, the watchdog timer 205 reaches zero, sets the recovery mode flag to high, and asserts the RST. Similar to clock cycle 3, in response to the RST assertion, the processing unit 202 again fetches the default reset vector 212 on the address bus in clock cycle p+2. However, here, the setting of the recovery mode flag triggers the address modifier logic 203 to modify the default reset vector 212 to the relocated reset vector 216 in a region 410 as shown in FIG. 4. To ensure the processing unit 202 reads a valid relocated reset vector, in one implementation, the read signal is placed in a delay buffer so that the processing unit 202 does not attempt to read the address lines until the relocated reset vector is valid for a full clock cycle. For the implementation shown in FIG. 4, although the processing unit 202 asserts the read signal in clock cycle p+2, the read signal is buffered for one clock cycle, so that the processing unit 202 actually reads the relocated reset vector 216 in clock cycle p+3, not clock cycle p+2. It is worth noting that the processing unit 202 is not aware of the address modification and continues to fetch the default reset vector 212 coming out a reset condition.

Figure 5:
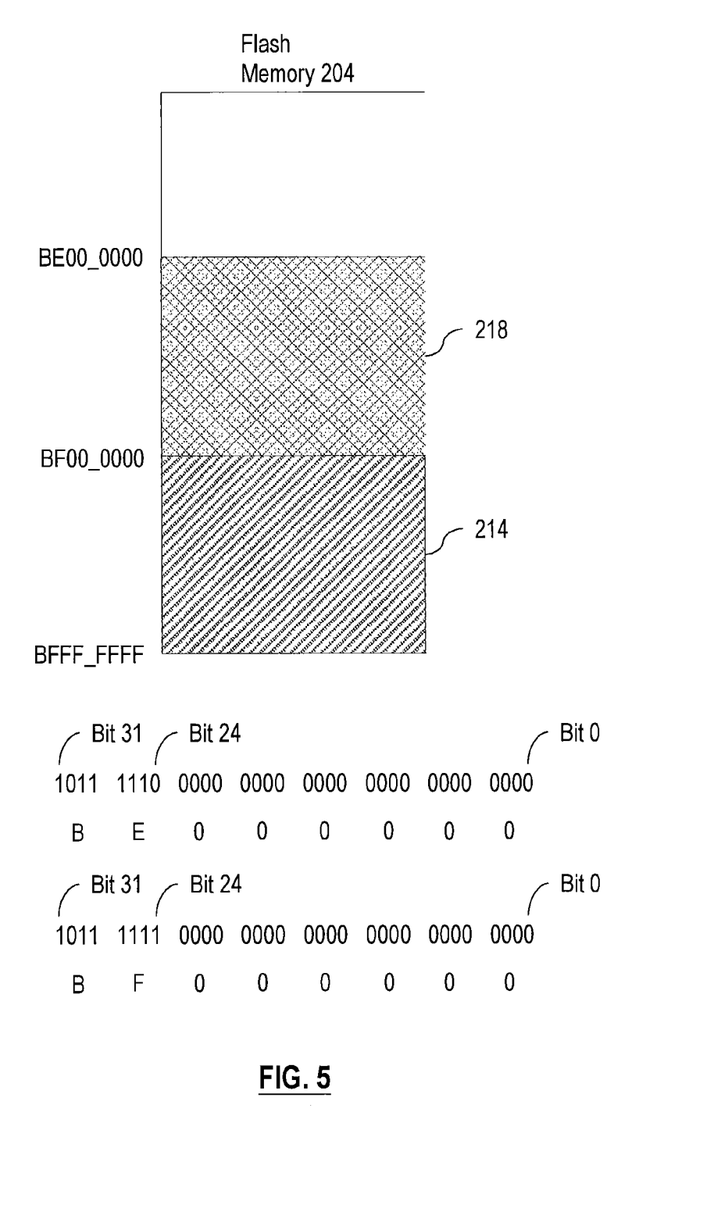
FIG. 5 is a conceptual diagram illustrating the effect of modifying an address bit on a memory system, according to one embodiment of the present invention.

To perform the address modification in one clock cycle, one embodiment of the address modifier logic 203 of FIG. 2A modifies a single bit out of the address lines. To illustrate, suppose the address lines are 32 bits wide and are denoted as bit 0 to bit 31 as shown in FIG. 5. Here, the default reset vector 212 corresponds to the memory location 0xBFFF_FFFF, and the relocated reset vector 216 corresponds to the memory location 0xBEFF_FFFF. Also, the first segment 214 for the version 2 code corresponds to the memory locations 0xBF00_0000–0xBFFF_FFFF, while the second segment 218 for the version 1 code corresponds to the memory locations 0xBE00_0000–0xBEFF_FFFF. One approach to access the relocated reset vector 216 and the second segment 218 is by flipping bit 24 of the address lines from a 1 to a 0 as shown in FIG. 5. In other words, since the processing unit 202 is not aware of the address modification, it continues to fetch addresses from the first segment 214. With the recovery mode flag activated, the address modifier logic 203 "flips" bit 24 of each of these fetched addresses, so that the processing unit 202 in effect accesses the second segment 218.

Figure 6:
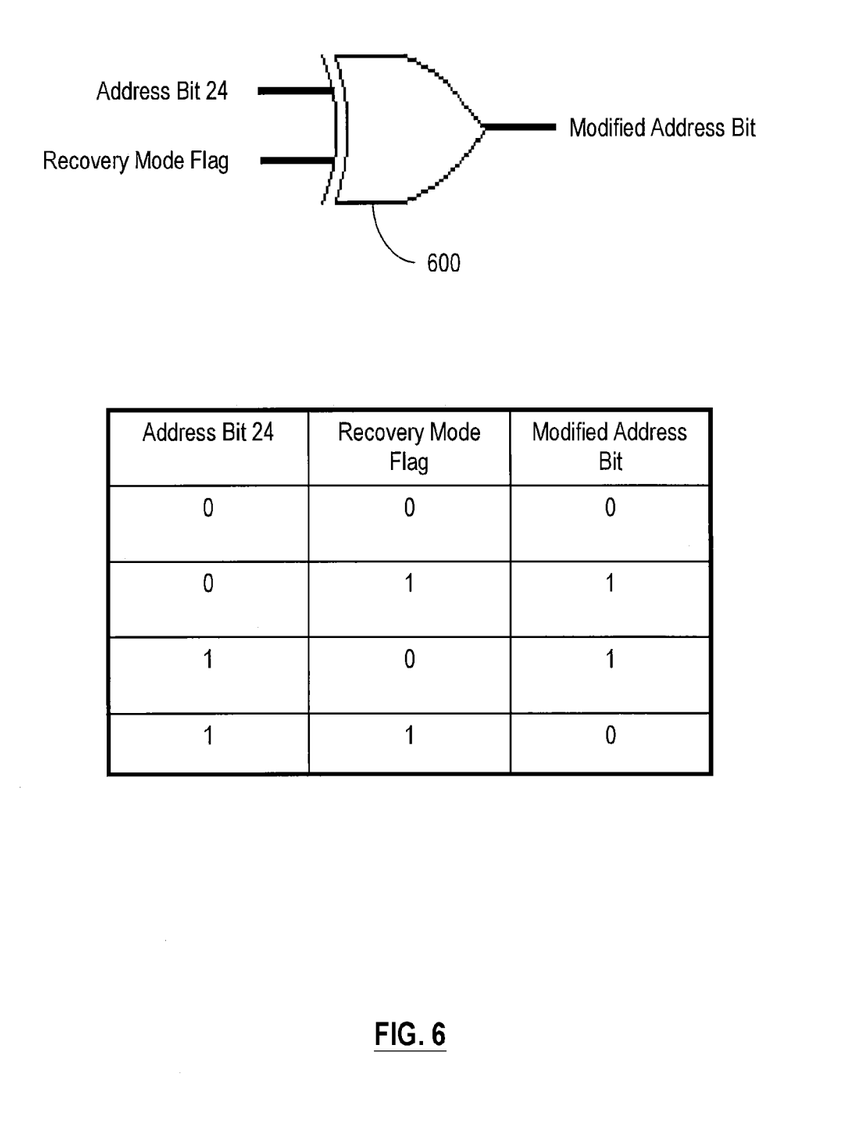
FIG. 6 is a logic gate implementation of address modifier logic, according to one embodiment of the present invention.

FIG. 6 is a logic gate implementation of the address modifier logic 203, according to one embodiment of the present invention. Specifically, an exclusive OR ("XOR") gate 600 generates a modified address bit based on the logic relationships detailed in the table shown in FIG. 6. Continuing with the example discussed above, the two inputs to the XOR gate 600 are the address bit to be modified (e.g., bit 24) and also the recovery mode flag. In other words, if the recovery mode flag is not set, then the address modifier logic 203 does not modify any address bit. It should be apparent to a person with ordinary skills in the art to recognize that bits other than bit 24 in the address lines may be modified as long as the storing of the new software image (e.g., the version 2 code) does not overwrite the memory locations in the relocated segment (e.g., the second segment 218 containing the backed up version 1 code) without exceeding the scope of the present invention.

As mentioned above, after the computing device 200 successfully recovers from errors during a software upgrade process, some implementation options are possible. In one implementation, the recovery mode flag is deasserted under the following conditions: (1) if the watchdog timer 205 of FIG. 2A does not countdown to zero and does not assert its signal high, but the RST is asserted high, then the recovery mode flag is deasserted; (2) if the watchdog timer 205 countdowns to zero and asserts its signal high, and the RST is also asserted high, then the recovery mode flag remains asserted; (3) if the watchdog timer 205 does not countdown to zero and does not assert its signal high, and the RST is also deasserted, then the recovery mode flag remains asserted. In addition, if the version 1 code is backed up in the second segment 218 as discussed above, then one implementation may continue to keep the version 1 code as the working copy code in the second segment 218 for future software upgrades. Also, at any time the address modifier logic 203 is activated, messages can be generated to alert a user of the computing device 200 to provide comfort and information to the user.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A method for upgrading a software component on a computing device, the method comprising:
   storing a first software component in a first memory segment;
   maintaining a second software component in a second memory segment, different from the first memory segment, wherein the second software component enables the computing device to boot up;
   while continuing to store both the first software component in the first memory segment and the second software component in the second memory segment, modifying one or more address lines to access at least a portion of the second software component in the second memory segment after exiting a reset condition, when the execution of the first software component fails to satisfy a predetermined test condition;
   asserting a recovery mode flag and a first reset signal after failing to satisfy the predetermined test condition;
   fetching a reset vector from the first memory segment in response to the assertion of the first reset signal; and
   modifying the reset vector and placing a relocated address in the second memory segment on the one or more address lines in response to the assertion of the recovery mode flag.

2. The method of claim 1, wherein the modifying step further comprises:
   asserting a read signal to read the relocated address on the one or more address lines in response to the assertion of the first reset signal; and
   buffering the read signal until the relocated address is ready for retrieval.

3. The method of claim 2, further comprising deasserting the recovery mode flag if the computing device boots up successfully after reading the relocated address.

4. The method of claim 3, wherein the deasserting step is performed if the predetermined test condition is satisfied and if a second reset signal is asserted to boot up the computing device.

5. The method of claim 1, wherein the modifying step is performed by an exclusive OR ("XOR") gate in a single clock cycle with the recovery mode flag as one input and one or more address lines to be modified as the other input.

6. The method of claim 1, further comprising copying the second software component initially stored in the first memory segment to the second memory segment, prior to the storing of the first software component in the first memory segment.

7. The method of claim 1, wherein the second software component includes instructions, when executed, cause the retrieval of a working software component pre-loaded in a read-only memory ("ROM") module for further processing.

8. The method of claim 1, wherein the predetermined test condition is to reset a counter before the counter completes counting down a predetermined value.

9. A non-transitory computer-readable medium containing a sequence of instructions, which when executed by a processing unit in a computing device, causes the computing device to:
   store a first software component in a first memory segment;
   maintain a second software component in a second memory segment, different from the first memory segment, wherein the second software component enables the computing device to boot up;
   while continuing to store both the first software component in the first memory segment and the second software component in the second memory segment, modify one or more address lines to access at least a portion of the second software component in the second memory segment after exiting a reset condition, when the execution of the first software component fails to satisfy a predetermined test condition;
   assert a recovery mode flag and a first reset signal after failing to satisfy the predetermined test condition;

fetch a reset vector from the first memory segment in response to the assertion of the first reset signal; and modify the reset vector and placing a relocated address in the second memory segment on the one or more address lines in response to the assertion of the recovery mode flag.

10. The computer-readable medium of claim 9, further containing a sequence of instructions, which when executed by the processing unit, causes the computing device to:

assert a read signal to read the relocated address on the one or more address lines in response to the assertion of the first reset signal; and buffer the read signal until the relocated address is ready for retrieval.

11. The computer-readable medium of claim 10, further containing a sequence of instructions, which when executed by the processing unit, causes the computing device to deassert the recovery mode flag if the computing device boots up successfully after reading the relocated address.

12. The computer-readable medium of claim 9, further containing a sequence of instructions, which when executed by the processing unit, causes the computing device to copy the second software component initially stored in the first memory segment to the second memory segment, prior to the storing of the first software component in the first memory segment.

13. The computer-readable medium of claim 9, wherein the predetermined test condition is to reset a counter before the counter completes counting down a predetermined value.

14. The computer-readable medium of claim 9, wherein the modifying step is performed by an exclusive OR ("XOR") gate in a single clock cycle with the recovery mode flag as one input and one or more address lines to be modified as the other input.

15. The computer-readable medium of claim 9, wherein the second software component includes instructions, when executed, cause the retrieval of a working software component pre-loaded in a read-only memory ("ROM") module for further processing.

16. A computing device configured to perform an upgrade of a software component, the computing device comprising:

a processing unit,
a writeable memory system;
a watchdog timer;
a system memory; and
an address modifier unit,
wherein the processing unit is configured to:
store a first software component in a first memory segment of the writeable memory system,
maintain a second software component in a second memory segment of the writeable memory system, different from the first memory segment of the writeable memory system, wherein the second software component enables the computing device to boot up, and while continuing to store both the first software component in the first memory segment and the second software component in the second memory segment, activate the watchdog timer, wherein the watchdog timer triggers the address modifier unit to modify one or more address lines to access at least a portion of the second software component in the second memory segment after exiting a reset condition, when the execution of the first software component fails to timely reset the watchdog timer, wherein the watchdog timer is configured to assert a recovery mode flag and a first reset signal after failing to be timely reset;

wherein the processing unit is configured to fetch a reset vector from the first memory segment in response to the assertion of the first reset signal; and wherein the address modifier unit is configured to modify the reset vector and places a relocated address in the second memory segment on the one or more address lines in response to the assertion of the recovery mode flag.

17. The computing device of claim 16, wherein:

the processing unit is configured to assert a read signal to read the relocated address on the one or more address lines in response to the assertion of the first reset signal; and a delay buffer, coupled to the processing unit and configured to buffer the read signal until the relocated address is ready for retrieval.

18. The computing device of claim 17, wherein the watchdog timer is configured to deassert the recovery mode flag if the computing device boots up successfully after reading the relocated address.

19. The computer-readable medium of claim 18, wherein the deasserting step is performed if a predetermined test condition is satisfied and if a second reset signal is asserted to boot up the computing device.

20. The computing device of claim 16, wherein the address modifier unit includes an exclusive OR ("XOR") gate to modify one or more address lines in a single clock cycle with the recovery mode flag as one input and the one address line to be modified as the other input.

* * * * *